CRANE BOOM STRUCTURE
Original Filed Jan. 19, 1959 3 Sheets-Sheet 1
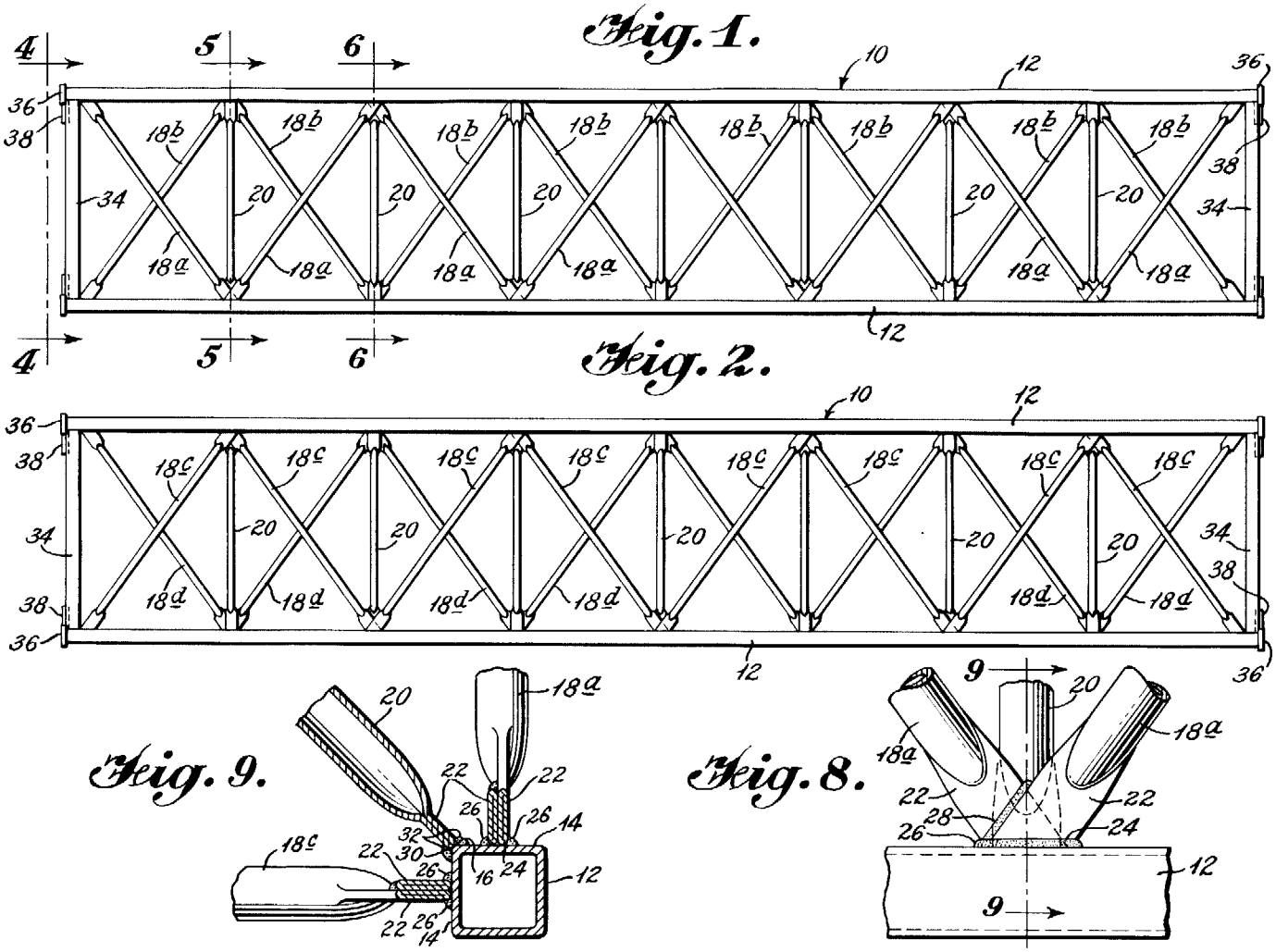

CRANE BOOM STRUCTURE

Original Filed Jan. 19, 1959 3 Sheets-Sheet 2

CRANE BOOM STRUCTURE

Original Filed Jan. 19, 1959 3 Sheets-Sheet 3

United States Patent Office

Re. 25,916
Reissued Nov. 23, 1965

25,916
CRANE BOOM STRUCTURE

Edwin Korensky and Robert E. Thune, Cedar Rapids, Iowa, assignors, by mesne assignments, to Link-Belt Company, a corporation of Illinois Original No. 3,021,014, dated Feb. 13, 1962, Ser. No. 787,544, Jan. 19, 1959. Application for reissue Sept. 14, 1962, Ser. No. 224,289
2 Claims. (Cl. 212—144)

Matter enclosed in heavy brackets [ ] appears in the original patent but forms no part of this reissue specification; matter printed in italics indicates the additions made by reissue.

This invention relates to crane booms and deals more particularly with a construction which is particularly suitable for use in the fabricating of long booms and especially those equipped with jib extensions.

An object of this invention is to provide a boom of latticed construction having a high strength-to-weight ratio and fabricated by welding together common structural members.

Another object of this invention is to provide a boom having improved resistance to torsional stresses, such as may be imposed thereon by the use of a jib extension on its outer end, the improved torsional resistance being obtained with substantially no increase in the weight of the boom per unit length over conventional boom structures.

A further object of this invention is to provide a boom construction wherein struts tying together longitudinal chords are connected by welded joints to the chords and to each other at regular intervals along each chord, the joint at each interval connecting a maximum number of strut ends to reduce the number of joints required, and the strut ends forming each joint being arranged in a manner permitting their weldment to the respective chord while exposing a minimum length of the chord to the welding temperature.

Other objects and advantages of the invention will be apparent during the course of the following description.

Figure 3:
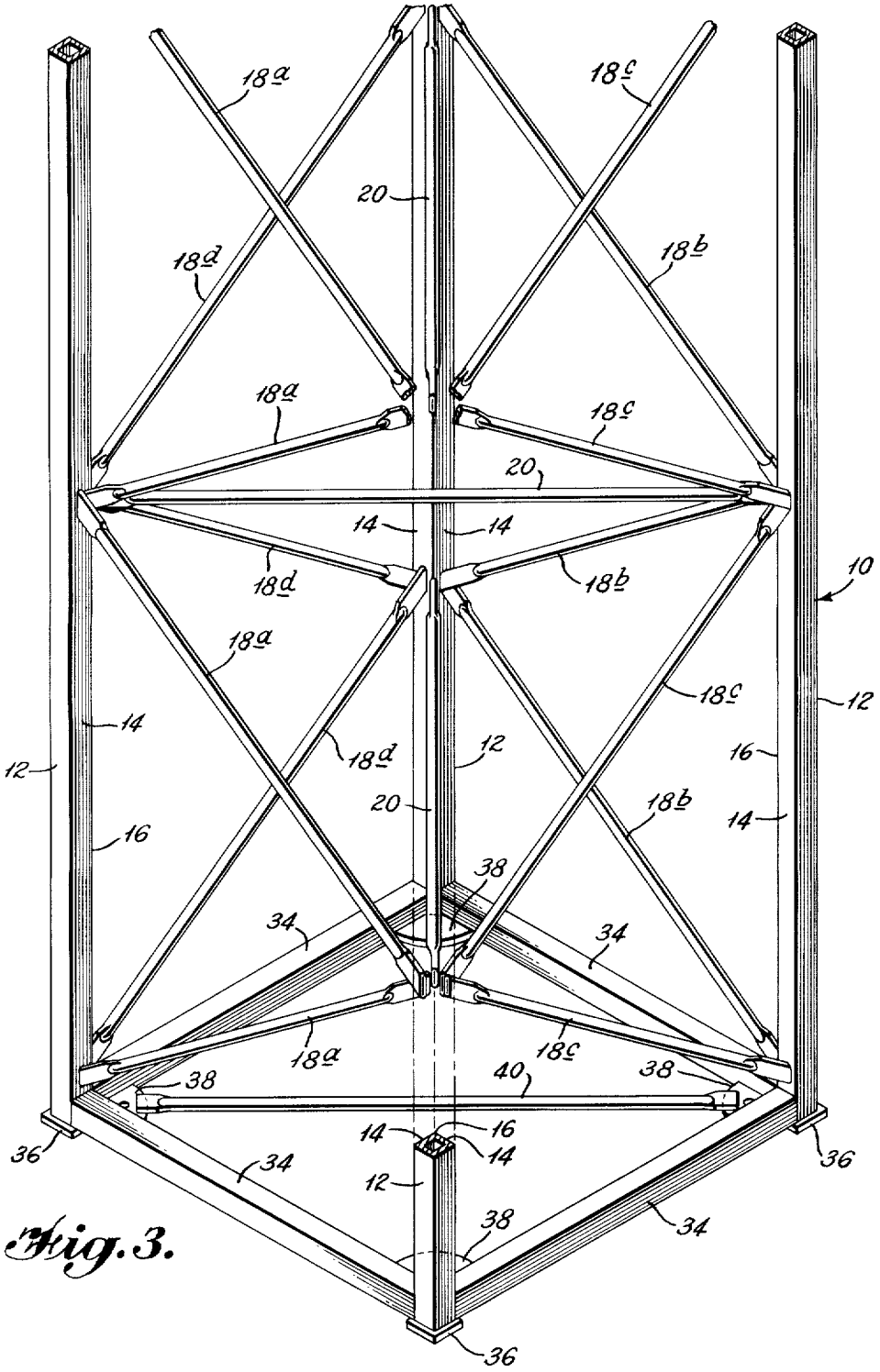
Figure 7:
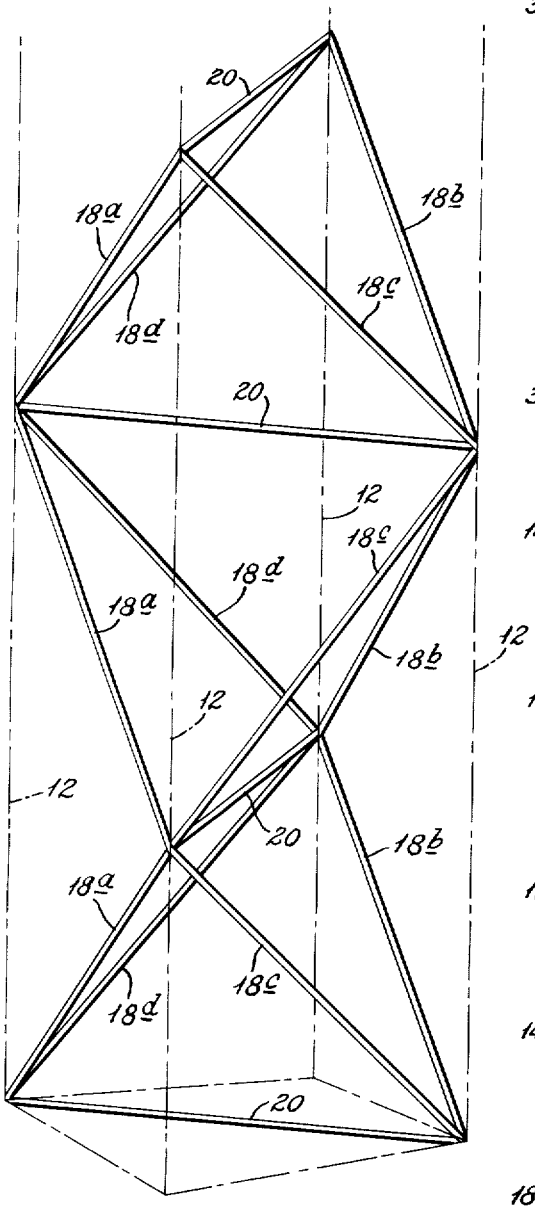
Figure 4:
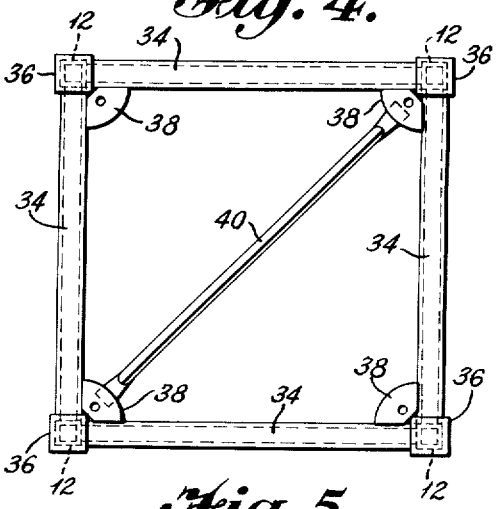
Figure 5:
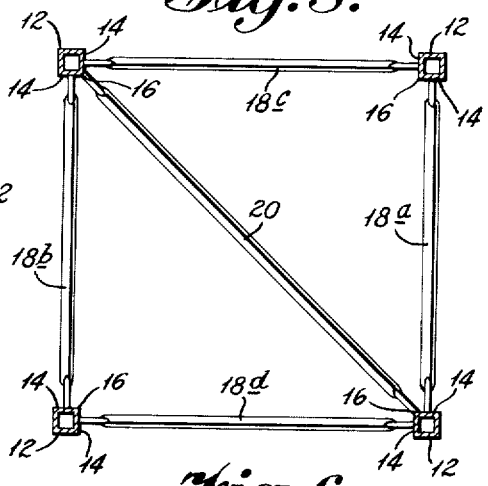
Figure 6:
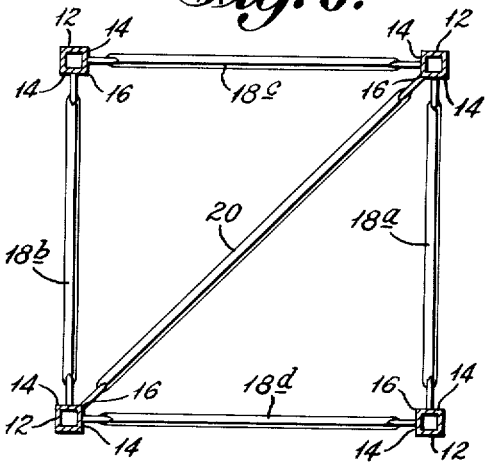

In the accompanying drawings forming a part of this specification and in which like numerals are employed to designate like parts throughout the same, FIGURE 1 is a side elevational view of a crane boom section embodying the present invention, FIGURE 2 is a similar view to FIG. 1 but with the crane boom section rotated 90 degrees about its longitudinal axis, FIGURE 3 is an enlarged perspective view of part of the crane boom section illustrated in FIG. 1, with certain parts being broken away to more clearly illustrate the structural details, FIGURE 4 is an end elevational view of the crane boom section shown in FIG. 1, FIGURE 5 is a sectional view taken on the line 5—5 of FIG. 1, FIGURE 6 is a sectional view taken on the line 6—6 of FIG. 1, FIGURE 7 is a schematic view of part of the crane boom section of FIG. 1 illustrating the geometric arrangement of the struts which tie together the four longitudinal chords.

FIGURE 8 is an enlarged side view of one of the joints employed in the crane boom section illustrated in FIG. 1, and FIGURE 9 is a sectional view taken on the line 9—9 of FIG. 8.

In the drawings, wherein for the purpose of illustration is shown a preferred embodiment of this invention, and first particularly referring to FIGS. 1, 2 and 3, there is shown a boom section 10 for use in connection with cranes, or similar equipment, requiring an elongated load supporting structure. By fastening together end-to-end a number of boom sections 10, with appropriate end sections, a boom of any desired length may be produced. It will be understood, however, that the basic structure illustrated could be used to fabricate a unitary boom without departing from the invention. Since, however, sectionalized booms are generally preferred over unitary booms, due to the fact that they lend themselves readily to adjustments in length, and to dismantling for more convenient transportation, a sectionalized boom has been chosen for purposes of illustration.

As seen from FIGS. 1, 2 and 3, the boom section 10 comprises four longitudinal chords 12, which in this instance are arranged parallel to one another and placed so as to define, respectively, the four corners of a rectangular parallelepiped having substantially equal side dimensions. The longitudinal chords 12 are formed from lengths of square tubing and are so oriented that each surface of the chord is parallel to one of the sides of the boom. Each longitudinal chord 12, therefore, has two inner surfaces 14 which, as best seen in FIG. 3, are normal to each other and are each parallel to an inner surface 14 of an adjacent chord. The two inner surfaces 14 intersect along an inner edge 16 which is directed towards the diagonally opposite chord 12.

Between each pair of longitudinal chords 12, which define a side of the boom 10, extend a plurality of side struts which tie said chords together. For purposes of clarity, the side struts in the drawings have been given the reference characters 18a, 18b, 18c and 18d, wherein 18a indicates the side struts associated with one side of the boom section 10, and 18b, 18c and 18d indicate the side struts associated, respectively, with each of the other three sides of the boom section 10.

As seen best in FIGS. 1 and 2, the plurality of side struts associated with each side of the boom are arranged in zig-zag fashion between the two longitudinal chords 12 defining that particular boom side.

For example, it will be noted from FIG. 1 that all of the struts 18a are positioned on the near side of the boom section 10 while all of the struts 18b are positioned on the far side. All of the struts 18a and 18b are of the same length and such length is greater than the distance straight across the boom section between the chords 12 to which the ends of the struts 18a or 18b are connected. Therefore, the points of connection of the opposite ends of each strut with its two chords are spaced longitudinally of the boom section.

Starting with the left-hand end of the boom section, as seen in FIG. 1, it will be noted that the first and second struts 18a have their lower ends connected together at the location where such ends are connected to the lower chord 12 while the second and third struts 18a have their upper ends connected together at the location where such ends are connected to the upper chord 12. By arranging all of the struts 18a in this manner throughout the length of the boom section 10, the struts in combination with their chords define a series of triangles with each strut 18a forming a common side for two adjacent triangles. In sections, such as the one illustrated, where the chords are parallel to one another these triangles are isosceles in form. In other sections, however, such as those at the top and bottom of the boom, the chords may not be parallel, making the triangles defined by the chords and side struts irregular in form rather than isosceles.

The struts 18b for the opposite side of the boom section, as viewed in FIG. 1, are arranged in the same manner as the struts 18a but the point of connection of any two adjacent struts 18b with their proper chord 12 is directly opposite a point of connection of two adjacent struts 18a with their chord 12. When looking through the boom section 10 from front to back, it will be noted that opposite struts 18a and 18b cross each other at their centers.

As seen in FIG. 2, all of the struts 18c and 18d are arranged like the struts 18b and 18a, respectively. Therefore, one end of each strut 18c is connected to the same chord 12, and substantially at the same location along the length of that chord, as one end of each strut 18a while the opposite end of each strut 18c is connected to the same chord 12, and substantially at the same location along the length of that chord, as one end of each strut 18b. Also, the opposite ends of each strut 18d are associated in the same manner with ends of the struts 18a and 18b, but the ends of the struts 18d are never connected to the same chords 12 as the ends of the struts 18c.

The above described association of the ends of the struts 18a, 18b, 18c, and 18d can best be appreciated by giving consideration to the disclosure afforded by FIGS. 3 and 7.

In addition to the side struts, the boom section 10 also includes diagonal struts 20 which are positioned in planes normal to the axis of the boom and, as seen in FIGS. 5 and 6, extend between diagonally opposite longitudinal chords 12. Every two adjacent diagonal struts 20 extend across the boom section at right angles to each other so that they cross at the longitudinal axis of the boom section and are connected to different diagonally opposed chords. Also, the ends of the diagonal struts 20 are positioned to engage the longitudinal chords 12 at the same locations as the side struts, so that each one of such locations is the common connection point between a chord, four side struts and one diagonal strut.

The arrangement between the side struts and the diagonal struts is brought out more fully in FIG. 7, which illustrates schematically a portion of the boom section 10 with the longitudinal chords 12 removed and indicated only generally by the broken vertical lines. From this figure it will be noted that the side struts and diagonal struts together geometrically define a successive series of tetrahedrons within the space described by the four longitudinal chords 12. Also, additional tetrahedrons are defined along the length of the section by the chords, the side struts and the diagonal struts, the length of chord between each two adjacent joint connections forming the edge of a tetrahedron having its other edges formed by four side struts and one diagonal strut. That is, in addition to the series of tetrahedrons formed by the side and diagonal struts alone there is also formed four other series of successive tetrahedrons along the length of the boom by the side and diagonal struts taken in combination with the four longitudinal chords, each of the longitudinal chords forming an edge of each tetrahedron in a respective one of these series. For example, referring to FIG. 7, it will be noted that the longitudinal chord 12 closest to the left-hand edge of the drawing forms an edge of each tetrahedron in a series of tetrahedrons defined by this chord, the side struts 18a and 18d, and every other diagonal strut 20. Likewise, the longitudinal chord 12 closest to the right-hand edge of the drawing forms an edge of each tetrahedron in a successive series of tetrahedrons defined by this chord, the side struts 18b and 18c, and every other diagonal strut 20. The two other longitudinal chords 12 similarly define edges for two other series of tetrahedron, one series being formed by one of the chords, the side struts 18c and 18d, can alternate diagonal struts; and the other series being formed by the other of these chords, the side struts 18b and 18d, and alternate diagonal struts. By this arrangement a minimum number of joint connections between the longitudinal chords and the struts is required, and increased load handling capacity is obtained, particularly in regard torsional stresses applied about the axis of the boom.

From the above it will also be noted that the side struts associated with one of the sides of the boom section 10 may be omitted from the structure and that the resulting section, if otherwise constructed in accordance with the above description, will nevertheless include a tetrahedron-forming arrangement of parts giving improved strength characteristics to the section. For example, from FIG. 7 it is clear that if the side struts 18c were removed, two of the four series of successive tetrahedrons located along the length of the section and formed by the longitudinal chords taken in combination with the side and diagonal struts would still remain in the section. One is the series defined by alternate diagonal struts 20, the side struts 18a and 18d, and the left-hand chord 12 which is common to the side struts 18a and 18b; the other is the series defined by alternate diagonal struts 20, the side struts 18b and 18d, and the chord 12 common to the side struts 18b and 18d. Although it is preferable that none of the side struts be omitted from a second, it is sometimes desirable to do so, particularly in the case of end sections at the top or bottom of a boom, to provide clearance for cables and the like; and one of the features of this invention is that a section may be made without struts on one side, to provide such clearance, without severely affecting its strength.

Each joint construction between the various struts 18a to 18d and 20 and the longitudinal chords 12 is especially designed to permit the weldment of the struts to the chords while exposing a minimum length of the chord to the welding temperature, thereby reducing warpage or undesirable stresses in the longitudinal chords as a result of fabrication. Both the side struts and the diagonal struts 20, as best seen in FIGS. 8 and 9, are formed of round tubular stock and are flattened at their end portions 22. At their extreme ends 24 the side struts 18a to 18d abut the corresponding inner surfaces 14 of a longitudinal chord 12, with the flattened portion 22 being aligned parallel with the axis of the chord 12.

At each joint, one pair of side struts is connected to each of the inner surfaces 14, and the end portions 22 of each pair are overlapped as shown in FIG. 8 so that the ends 24 thereof engage the same lengthwise portion of the longitudinal chord 12. The ends 24 are welded to the corresponding surface 14 by a fillet weld 26 on either side of the overlapped portions, as seen in FIG. 9, and the two side struts are additionally welded together by a fillet weld 28 where the edge of one flattened portion 22 crosses the surface of the other flattened portion. The extreme end 30 of the diagonal strut 20 engages the inner edge 16 of the longitudinal chord 12 along the same lengthwise portion as the side struts, and is welded thereto by fillet welds 32 as shown in FIG. 9. It will thus be seen that not only is a minimum length of the longitudinal chord 12 employed in making each of the joints required, but that where the struts intersect a chord only very narrow surfaces are presented to the chord so that a minimum of welding is required.

In addition to the structure above described, each boom section 10 also includes suitable means for attaching one section to another to form a completed boom. In this instance, the boom section 10, at each end, includes four cross members 34, see FIGS. 3 and 4, with each cross member being located between a corresponding pair of longitudinal chords 12. All four of the cross members are disposed in a common plane normal to the axis of the boom section 10. The cross members 34 are welded at their ends to the longitudinal chords 12 and may be made from square tubular stock similar to that employed for the longitudinal chords 12. The end of each longitudinal chord 12 is provided with a pressure pad 36 adapted to engage a similar pad on another boom section which is to be connected thereto. At the corners of the cross members 34, apertured gussets 38 are provided through which bolts may be passed to fasten the ends of adjacent boom sections together in assembling a complete boom. The particular means for joining the boom sections however, do not form a part of the present invention, and it is intended that any other suitable means, such as pin connected members at the ends of the sections, could be used for this purpose.

As shown in FIGS. 3 and 4, the diagonal strut 40 at the end of the boom section 10 may be positioned between two diagonally opposite gussets 38 and welded thereto, rather than to the longitudinal chords 12, so as to provide easier access to the bolts which fasten the boom sections together.

It is to be understood that the form of this invention herewith shown and described is to be taken as a prefered example of the same and that various changes in the shape, size and arrangement of parts may be resorted to without departing from the spirit of the invention or the scope of the subjoined claims.

Having thus described the invention, we claim:

[1. A crane boom, comprising four longitudinal chords and a plurality of struts connecting each of said chords to each of said chords, such struts and chords defining a longitudinal series of tetrahedrons within the space defined by said chords.]

[2. A four-sided boom for cranes, comprising four longitudinal chords located at and defining the corners of the boom, a plurality of side struts connecting laterally adjacent chords, and a plurality of diagonal struts connecting diagonally opposite chords, said side struts and said diagonal struts together defining a longitudinally successive series of tetrahedrons within and along the length of said boom.]

[3. A four-sided boom for cranes, comprising four longitudinal chords located at and defining the corners of the boom, a plurality of diagonal struts each connecting the diagonally opposite chords, and a plurality of side struts associated with each of the sides of the boom and defining with said diagonal struts a series of tetrahedrons within and along the length of the boom, said diagonal struts being arranged at spaced intervals relative to one another along the length of the boom with each diagonal strut connecting a different pair of diagonally opposite chords than the next adjacent one, and the side struts associated with each side of said boom being arranged to form a zigzag pattern between the two laterally adjacent chords defining said side, each of said side struts connected to two laterally adjacent chords being located between two adjacent diagonal struts.]

[4. The combination as defined in claim 3 wherein said longitudinal chords are tubular, and said struts are tubular with the ends thereof flattened adjacent their points of connection to said chords.]

[5. The combination as defined in claim 3 wherein said longitudinal chords are disposed parallel to each other with each located at and defining a different corner of a square, and said side struts are each of uniform length whereby the side struts and the chords associated with each side of the boom form isosceles triangles.]

[6. A crane boom section comprising four longitudinal chords, and a plurality of struts connecting said chords, such chords and struts together defining a plurality of series tetrahedrons along the length of said boom section with each of said chords forming an edge of the tetrahedrons in a different one of said series.]

[7. A crane boom section, comprising four longitudinal chords and a plurality of struts connecting said chords to each of the other said chords at spaced points along the length thereof, said chords and said struts together defining a plurality of tetrahedrons along the length of said boom section said chords having connecting means at their opposite ends whereby adjacent similar sections may be assembled.]

[8. A crane boom section as defined in claim 7 further characterized by said struts alone defining a successive series of tetrahedrons along the length of the said section, and said struts and said chords in combination defining an additional plurality of tetrahedrons along the length of said section.]

[9. A crane boom section as defined in claim 7 further characteristized by said struts alone defining a successive series of tetrahedrons along the length of said section, and said struts and said chords in combination defining four additional successive series of tetrahedrons along the length of said section with each of said four longitudinal chords forming an edge of each tetrahedron in respective one of said series.]

[10. A four-sided boom for cranes, comprising four longitudinal chords located at and defining the corners of the boom, a plurality of diagonal struts located between diagonally opposite chords, a plurality of side struts associated with each side of the boom and located between the two chords defining the edges of the respective side, and a plurality of joints at spaced intervals along the length of each of said chords for connecting said diagonal and side struts to said chords in such a manner that said chords and struts together define a plurality of tetrahedrons within and along the length of said boom, each of said joints including a first pair of side struts welded to the associated chord at a given location along the length thereof and extending outwardly therefrom in the plane of one of the boom sides to which the chord is common and in generally opposite directions relative to the length of the boom, a second pair of side struts welded to said associated chord at said given location along the length thereof and extending outwardly therefrom in the plane of the other boom side to which the associated chord is common and in generally opposite directions relative to the length of the boom, and a diagonal strut welded to said chord at said given location between said two pairs of side struts and extending outwardly therefrom to the diagonally opposite chord, the diagonal strut and each of the side struts forming each of said joints having a flattened end portion adjacent the associated chord oriented in a plane parallel to the chord so that the end surface thereof which engages the chord is of narrow dimension, and the end portions of the side struts comprising each of said pairs being overlapped with the end surfaces thereof which engage the chord being laterally aligned and in engagement with the same lengthwise portion of the chord.]

*11. A four-sided crane boom having high resistance to torsional stresses applied about the axis of the boom in use comprising four longitudinal chords located at and defining the corners of the boom, a plurality of diagonal struts located between diagonally opposite chords, a plurality of side struts associated with each side of the boom and located between the two chords defining the edges of the respective side, and a plurality of rigid and permanent joints at spaced intervals along the length of each of said chords for connecting said diagonal and side struts to said chords in such a manner that said chords and struts together define a plurality of tetrahedrons within and along the length of said boom, each of said joints including a first pair of side struts welded to the associated chord at a given location along the length thereof and extending outwardly therefrom in the plane of one of the boom sides to which the chord is common and in generally opposite directions relative to the length of the boom, a second pair of side struts welded to said associated chord at said given location along the length thereof and extending outwardly therefrom in the plane of the other boom side to which the associated chord is common and in generally opposite directions relative to the length of the boom, and a diagonal strut welded to said chord at said given location between said two pairs of side struts and extending outwardly therefrom to the diagonally opposite chord, the diagonal strut and each of the side struts forming each of said joints having a flattened end portion adjacent the associated chord oriented in a plane parallel to the chord so that the end surface thereof which engages the chord is of narrow dimension, and the end portions of the side struts comprising each of said pairs being overlapped with the end surfaces thereof which engage the*

*chord being laterally aligned and in engagement with the same lengthwise portion of the chord.*

*12. A four-sided crane boom section having high resistance to torsional stresses applied about the axis of the boom in use comprising for longitudinal chords located at and defining the corners of the boom, connecting means mounted on said boom section at the opposite ends of each chord for rigidly connecting said boom section in end-to-end relationship with adjacent boom sections, a plurality of diagonal struts located between diagonally opposite chords, a plurality of side struts associated with each side of the boom and located between the two chords defining the edges of the respective side, and a plurality of rigid and permanent joints at spaced intervals along the length of each of said chords for connecting said diagonal and side struts to said chords in such a manner that said chords and struts together define a plurality of tetrahedrons within and along the length of said boom, each of said joints including a first pair of side struts welded to the associated chord at a given location along the length thereof and extending outwardly therefrom in the plane of one of the boom sides to which the chord is common and in generally opposite directions relative to the length of the boom, a second pair of side struts welded to said associated chord at said given location along the length thereof and extending outwardly therefrom in the plane of the other boom side to which the associated chord is common and in generally opposite directions relative to the length of the boom, and a diagonal strut welded to said chord at*

*said given location between said two pairs of side struts and extending outwardly therefrom to the diagonally opposite chord.*

References Cited by the Examiner

The following references, cited by the Examiner, are of record in the patented file of this patent or the original patent.

UNITED STATES PATENTS

| | | | |
|---|---|---|---|
| 1,444,491 | 2/1923 | Baldwin | 189—36 |
| 1,582,587 | 4/1926 | Dunlap | 189—36 |
| 1,760,883 | 6/1930 | Moss | 189—36 |
| 1,941,952 | 1/1934 | Nickles | 212—144 |
| 2,187,436 | 1/1940 | Thofehrn et al. | |
| 2,529,454 | 11/1950 | Marcantonio | 212—144 |
| 2,560,412 | 7/1951 | Calvert | 212—144 |
| 2,709,975 | 6/1955 | Parker. | |
| 2,964,147 | 12/1960 | Fentiman. | |

FOREIGN PATENTS

| | | |
|---|---|---|
| 283,568 | 4/1915 | Germany. |

SAMUEL F. COLEMAN, *Primary Examiner.*

ERNEST A. FALLER, KARL J. ALBRECHT, *Examiners.*

ARTHUR L. LEVINE, R. B. SANCHEZ, *Assistant Examiners.*